(12) United States Patent
Bunni

(10) Patent No.: US 11,834,796 B2
(45) Date of Patent: Dec. 5, 2023

(54) VEHICLE FOR PATCHING A ROAD PAVEMENT AND A METHOD THEREFOR

(71) Applicant: BUNNI S.r.L., Reggio nell'Emilia (IT)

(72) Inventor: Firas Bunni, Reggio nell'Emilia (IT)

(73) Assignee: BUNNI S.R.L., Reggio nell'emilia (IT)

( * ) Notice: Subject to any disclaimer, the term of this patent is extended or adjusted under 35 U.S.C. 154(b) by 388 days.

(21) Appl. No.: 17/362,197

(22) Filed: Jun. 29, 2021

(65) Prior Publication Data

US 2022/0002952 A1 Jan. 6, 2022

(30) Foreign Application Priority Data

Jul. 3, 2020 (IT) ........................ 102020000016135

(51) Int. Cl.
*E01C 19/40* (2006.01)
*E01C 19/45* (2006.01)
*E01C 23/06* (2006.01)

(52) U.S. Cl.
CPC .............. *E01C 19/45* (2013.01); *E01C 23/06* (2013.01)

(58) Field of Classification Search
CPC ................................ E01C 19/45; E01C 23/06
USPC ............................... 404/75, 77, 79, 101, 120
See application file for complete search history.

(56) References Cited

U.S. PATENT DOCUMENTS

| | | | |
|---|---|---|---|
| 5,752,782 A | 5/1998 | Hulicsko | |
| 5,967,695 A * | 10/1999 | Vural | E01C 23/065 404/90 |
| 8,167,513 B2 * | 5/2012 | Ryan | E01C 23/06 404/101 |
| 2006/0104716 A1 * | 5/2006 | Jones | E01C 23/065 404/95 |
| 2010/0316445 A1 * | 12/2010 | Kasahara | E01C 23/065 404/91 |
| 2012/0253612 A1 * | 10/2012 | Byrne | E01C 19/4853 404/133.05 |
| 2014/0119828 A1 * | 5/2014 | Rees | E01C 21/00 404/95 |
| 2015/0284916 A1 * | 10/2015 | Dworsky | E01C 11/005 404/95 |
| 2016/0060822 A1 * | 3/2016 | Kanerva | H04N 7/181 404/84.05 |

FOREIGN PATENT DOCUMENTS

| | | |
|---|---|---|
| RU | 2674483 C1 | 12/2018 |
| WO | WO 2000/26470 A1 | 5/2000 |
| WO | WO 2019/190032 A1 | 10/2019 |

* cited by examiner

*Primary Examiner* — Raymond W Addie
(74) *Attorney, Agent, or Firm* — R. Neil Sudol; Henry D. Coleman

(57) ABSTRACT

A vehicle for patching road pavements comprising a frame, a container for holding the new paving material, a radiating plate, a rake, a paver for distributing and levelling a new paving material, a compactor and a support structure which comprises a movable part. The frame supports the support structure and the container which comprises an outlet for supplying the paver. The movable part bears the paver, the rake and the compactor and translates with respect to the frame in a first direction from a retracted position to an extracted position so that they operate on successive parts of the zone to be patched. The radiating plate is movable vertically beneath the frame and the rake is vertically movable with respect to the paver and the compactor.

15 Claims, 15 Drawing Sheets

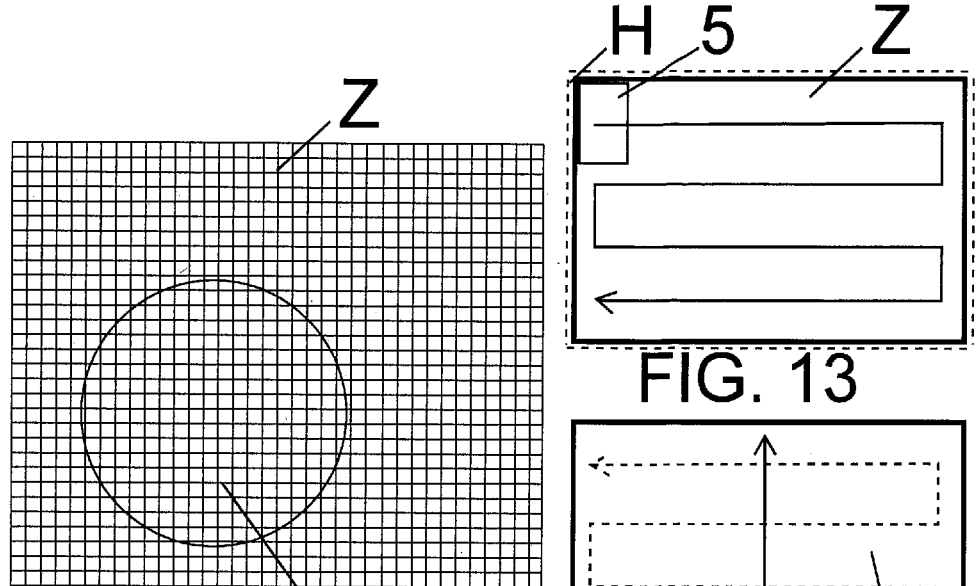
FIG. 12
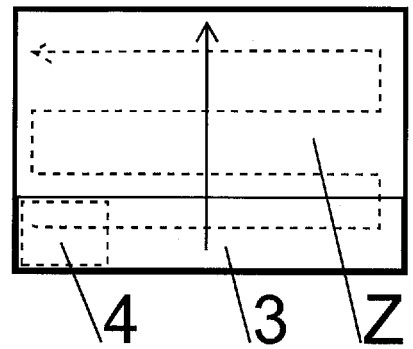
FIG. 13
FIG. 14
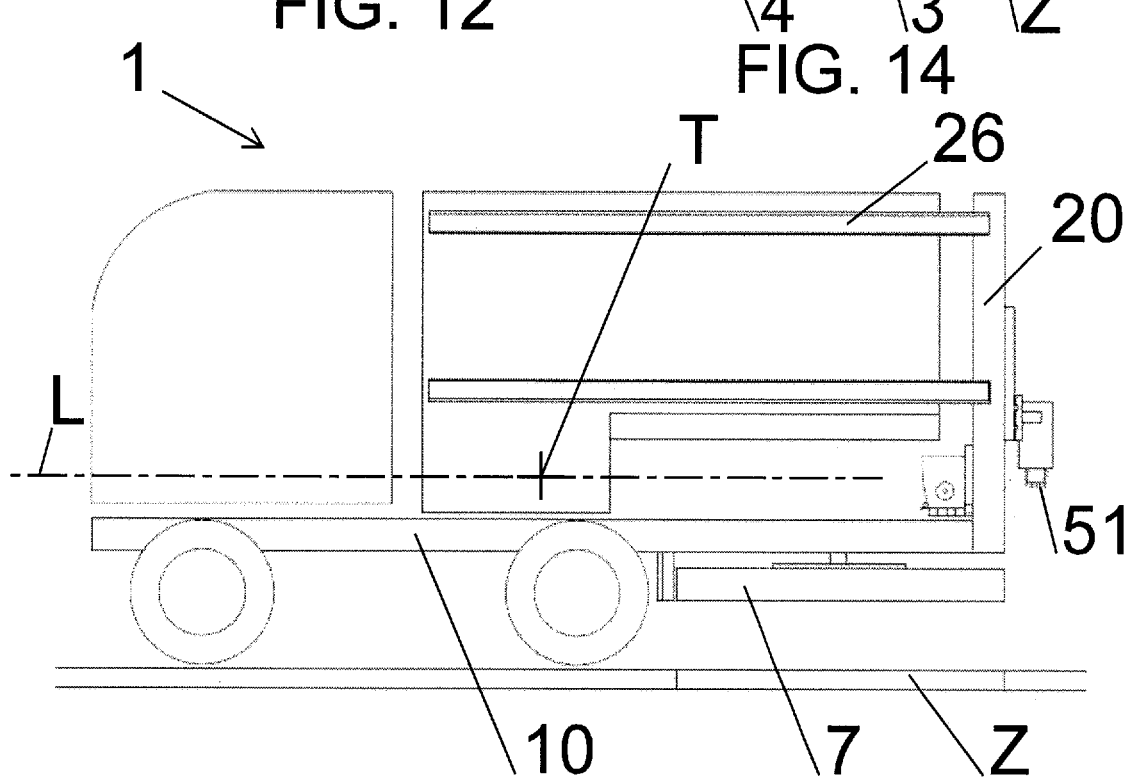
FIG. 15

VEHICLE FOR PATCHING A ROAD PAVEMENT AND A METHOD THEREFOR

FIELD OF THE INVENTION

The present invention relates to the sector of machines for patching roads, in particular the maintenance or patching of existing road pavements.

In more detail, the invention relates to a vehicle, preferably self-propelling, and to a method for patching road pavements, comprising bituminous mixes.

DESCRIPTION OF THE PRIOR ART

A road pavement is typically made on a foundation layer laid on natural terrain and comprises superposed layers: vehicular traffic is ensured by a layer for traffic use acting as a substantially horizontal rest plane and laid on a connecting layer or binder layer on the base layer.

Road pavements are mainly subjected to vehicular load and atmospheric agents and are often subject to cracking or other localised defects which compromise the functionality thereof, even well before the working life of the project has reached its end. Further, road managers also tend to continue with the use of these roads even after the working life of the project has concluded. A need is therefore perceived to repair, in a timely fashion, the road pavement with maintenance interventions of the patching type, i.e. by intervening on limited areas with respect to the extension of the road pavement. Types of maintenance of this type must guarantee low costs and rapid interventions both to prevent damage to vehicles and persons and to avoid any increase in road damage as the cracks tend to increase in size and accumulate water, which infiltrates the underlying layers, removing the support and aggravating the damage. Also perceived is the need to intervene widely over a vast road network, with a wide-ranging intervention on a large number of single patches, while guaranteeing the durability of the operations, i.e. with definitive interventions having a working life of at least the same as the remaining part of the patched road pavement.

Notwithstanding the fact that numerous tools, machinery and vehicles have been developed, still today the case-by-case maintenance operations are often done manually or semi-manually, with repercussions for the health and safety of the operatives and an increase in intervention times and, consequently, on the relative costs.

Often the pothole is filled with cold asphalt type asphalt or hot asphalt type asphalt and compacted using manual tools. Sometimes existing asphalt is replasticised with the aid of radiating plates before the laying of new paving material. In the second above case, in general the existing road pavement is softened, as well as removed and/or mixed. In a known practice, the heated existing road pavement is raked and, following the distribution and levelling of the new material, is compacted. Generally, following the raking bitumen is sprayed to best regenerate the existing road pavement.

The above-described operations can be carried out with the aid of a self-propelling vehicle such as the one divulged in U.S. Pat. No. 3,564,985A; this vehicle supports a heating plate and enables the transport of whatever is needed for the manual restoring, for example: a vibrating compactor, rakes, shovels, picks and brooms. In U.S. Pat. No. 3,564,985A the radiating plate is borne on the back of the vehicle and is hinged to the frame of the vehicle between a vertical non-active position and a horizontal active position. This solution requires the team of maintenance operatives to get out of the vehicle, to position the radiating plate, to rake the zone to be patched, to spread new material, to level the zone to be patched and to compact the zone to be patched.

To reduce the operatives necessary and increase productivity vehicles have been developed that comprise pavers and compactors that are movable with respect to the vehicle frame in order to more easily reach the zone to be patched. Examples are shown in U.S. Pat. Nos. 4,830,533A, 5,236,275A and US2007065229A1.

Further, some vehicles have been fitted with equipment to realise patches without requiring the intervention of personnel on the ground, for example US2010322710A1, U.S. Pat. Nos. 3,820,914A and 5,752,782A.

Some of the above-mentioned solutions, such as for example US2010322710A1, are limited to filling small potholes with new material and do not really obviate the critical issues as the working life of these interventions is very brief. The other solutions require the intervention of operatives on the ground, such as for example U.S. Pat. No. 3,564,985A, or do not allow timely treatment of single zones as they make a new asphalting layer and not a patch on the road pavement, such as for example U.S. Pat. No. 3,820,914A.

A need is therefore perceived for solutions that automate the patching of existing road pavements, and, preferably, enable a simple integration with the most modern management systems of road infrastructure, at the same time guaranteeing the quality and timeliness of the interventions, an economic saving with respect to the traditional solutions and the safety of the operatives and the vehicular traffic during the intervention.

SUMMARY OF THE INVENTION

A first aim of the present invention is to provide a vehicle which patches zones of road pavement rapidly, effectively and with a limited requirement for operatives or, possibly, entirely without operatives.

A still further aim is to provide a vehicle enabling working on the zone to be patched so as to improve the aggregation between the existing road pavement material and the new paving material.

An aim of an embodiment is to improve the aggregation even in proximity of the edges of the zone to be patched.

These and other aims, which will be obvious to the expert in the sector from a reading of the following text, are attained by means of a vehicle for patching road pavements which comprise bituminous mixes according to claim 1 and of a method according to claim 10.

According to the teachings of this description, the vehicle comprises a frame, a container for receiving the new paving material, a radiating plate, a rake, a paver for distributing and levelling a new paving material, a compactor and a support structure which comprises a movable part.

The frame supports the support structure and the container, which comprises an outlet for feeding the paver with new paving material.

The movable part bears the paver, the rake and the compactor and translates with respect to the frame in a first direction from a retracted position to an extracted position, in which the size of the vehicle is greater. The movable part is configured to translate so that the rake, the paver and the compactor operate in succession on a plurality of parts of the zone to be patched.

The rake is vertically movable with respect to the paver and the compactor.

The frame supports the radiating plate which is movable vertically beneath the frame from a non-active position near to the frame to an active position away from the frame.

The method for patching road pavements with a vehicle of this type comprises steps of loading the container with new paving material, activating the radiating plate, activating the rake, loading the paver, activating the paver and activating the compactor.

BRIEF DESCRIPTION OF THE DRAWINGS

Specific embodiments of the invention will be described in the following part of the present description, according to what is set down in the claims and with the aid of the accompanying drawings, in which:

FIGS. from 1 to 5 illustrate perspective lateral views of an embodiment of the vehicle in the various steps of an embodiment of a method;

FIG. 12 is a schematic illustration of a zone to be patched in which an obstacle is present;

FIG. 13 illustrates the path of the rake in the zone to be patched according to an embodiment of the invention;

FIG. 14 illustrates the path of the paver, with a continuous line, and of the compactor, in a broken line, in the zone to be patched according to an embodiment of the invention;

FIGS. 15, 16, 17, 18 and 19 are lateral views, with detail views in the case of FIG. 17 and FIG. 18, of a further embodiment of the vehicle in the various steps of an embodiment of the method of the invention;

DESCRIPTION OF THE PREFERRED EMBODIMENTS

Figure 1:
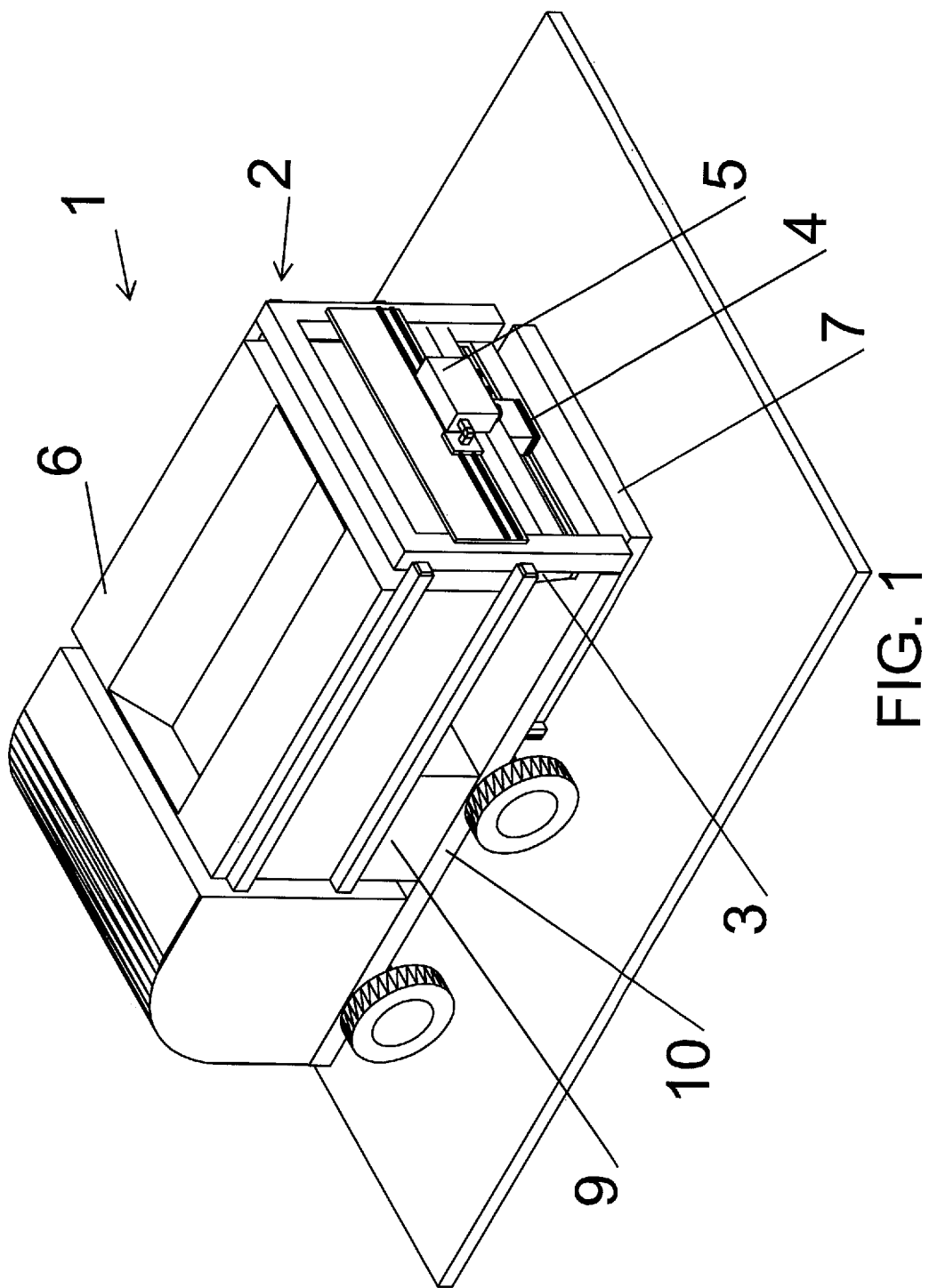

With reference to the appended drawings, reference numeral (1) denotes a vehicle for patching road pavements which comprise bituminous mixes. The vehicle is preferably self-propelling, in general a fitted truck.

An embodiment of the vehicle (1) which has a longitudinal direction (L) comprises a frame (10), a container (6) for holding the new paving material (N), a radiating plate (7) for heating a zone to be patched (Z) which has a radiating area, a rake (5) for raking, or mixing, the zone to be patched (Z), a paver (3) for distributing and levelling the new paving material (N) in the zone to be patched (Z), a compactor (4) for compacting the zone to be patched (Z) and the new paving material (N) and a support structure (2) which comprises a movable part (20).

The frame (10) supports the container (6) and the support structure (2).

The container (6) comprises an outlet (61) for feeding the paver (3) with the new paving material (N).

The movable part (20) bears the paver (3), the rake (5) and the compactor (4).

Further, the movable part (20) translates with respect to the frame (10) in a first direction (A) from a retracted position to an extracted position, in which the size of the vehicle (1) is greater.

Further, the movable part (20) is configured to translate so that the rake (5) operates in succession on a plurality of parts of the zone to be patched (Z), the paver (3) operates in succession on a plurality of parts of the zone to be patched (Z) and the compactor (4) operates in succession on a plurality of parts of the zone to be patched (Z).

The frame (10) further supports the radiating plate (7) which is movable vertically beneath the frame (10) from a non-active position near to the frame (10) to an active position away from the frame (10).

The rake (5) is vertically movable with respect to the paver (3) and the compactor (4).

The translation of the movable part (20) advantageously enables covering the zone to be patched (Z) which zone is of greater dimensions with respect to the operating areas of the single tools, i.e. the rake (5), the paver (3) and the compactor (4). The above is without any need to move the vehicle (1) to the advantage of the quality of the patch and the safety; without taking into consideration that there is usually a reduction in pollutant emissions.

The configuration of the vehicle (1) described above enables a reduction in the dimensions of the vehicle (1) when moving, while still being equipped with the tools required for carrying out the work in the best way, i.e. the work of obtaining a definitive patch. In particular, small sizes enable operation on narrow roads and creating fewer disruptions for vehicular traffic. This is evident from a comparison between FIG. 5, with the movable part (20) in the extracted position, and FIG. 1 with the movable part (20) in the retracted position.

Figure 17:
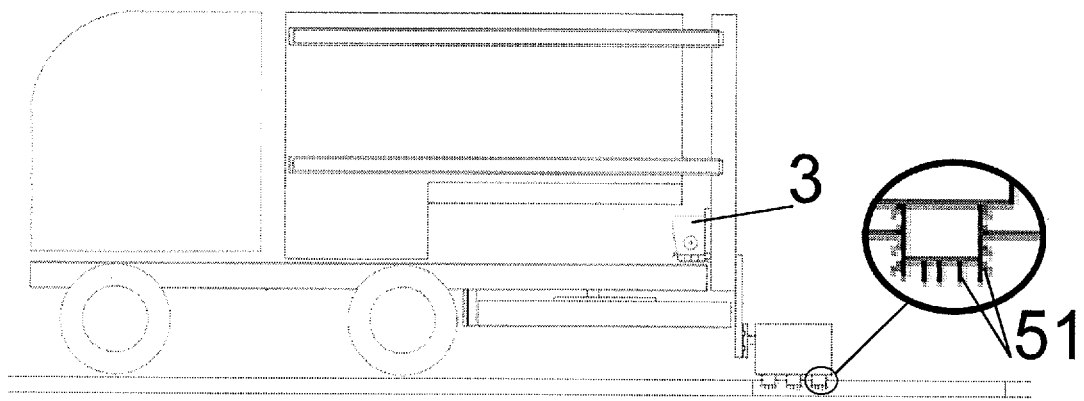

The vertical mobility of the rake (5) with respect to the paver (3) and the compactor (4) enables raking the existing road pavement after the heating with the radiating plate (7), i.e. working beneath the road pavement as can be seen, for example, in FIG. 17.

The rake (5) also enables operating the vehicle (1) on zones to be patched (Z) where the existing road pavement is raised, forming humps. For example the humps, which can project from the road pavement by a few centimetres, are formed at the position of fractures in which the paving material has been lost. The presence of humps does not enable working on the fractures in terms of a simple filling, as in the works of prior art.

During the heating of the zone to be patched (Z) with the radiating plate (7), the movable part (20) can remain in the retracted position, should it be desired to minimise the size of the vehicle (1).

Figure 2:
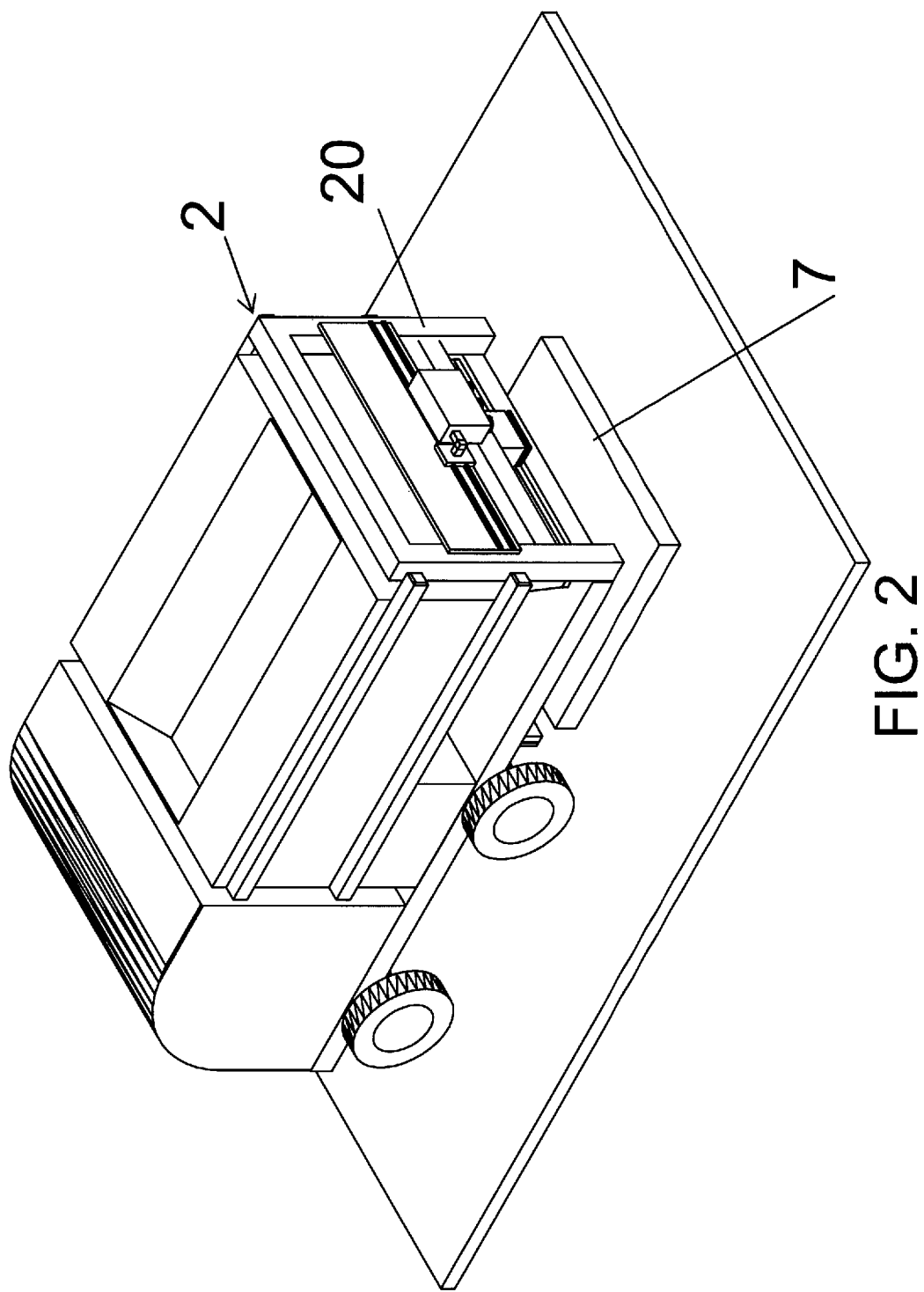
Figure 3:
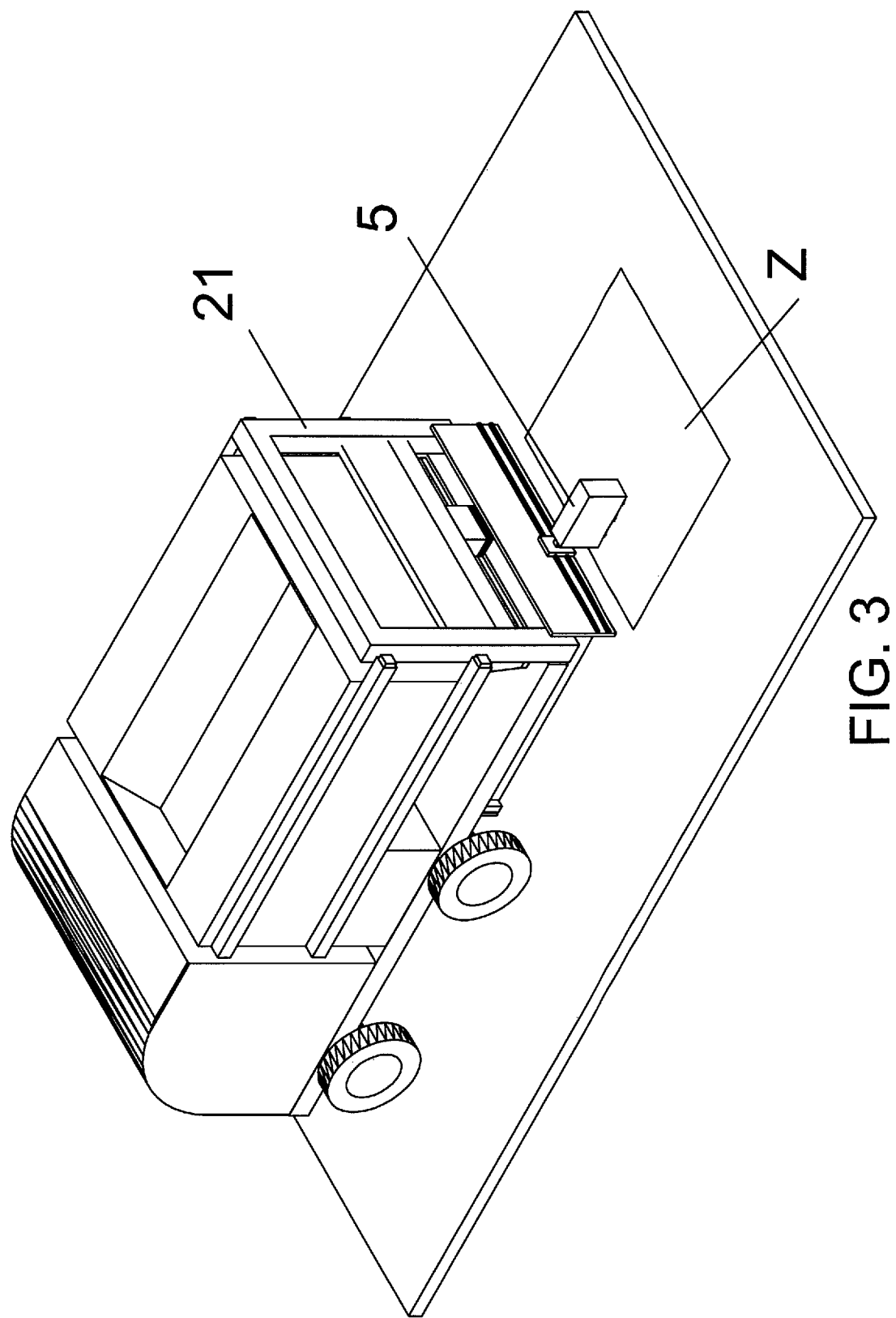

The active position of the radiating plate (7) is adjusted to be near the zone to be patched (Z), so as to heat the zone effectively; in the active position the radiating plate (7) is thus nearer to the zone to be patched (Z). The adjustment takes account of the height of the vehicle and, if appropriate, the readings of any sensors present which measure the distance from the ground surface. As can be seen in FIGS. 1 and 2 and as understandable from the method described herein below, the heating by the radiating plate (7) precedes the following operations; consequently the radiating plate (7) is in general located in an advanced position with respect to the movable part (20) according to the working direction and sense.

The first direction (A) is substantially horizontal, i.e. is parallel to the progress of the existing road pavement. For the simplicity of description, here and in the rest of this document, reference will be made to a hypothetical rest plane of the horizontal vehicle (1) instead of to the plane on which the longitudinal direction (L) and the transversal direction (T) of the vehicle (1) lie.

The container (6) is generally of known type and comprises an outlet (61) for feeding the paver (3) and an inlet for receiving the new paving material (N). The container (6) is preferably a thermal container, which enables keeping the temperature of the new paving material (N) hot, in general hot asphalt type asphalt. The thermal container (6) can possibly comprise heaters and/or can be removably fixed to the frame (10).

The term "new" is used in the present description to distinguish from the existing one, already present in the road pavement to be patched. As known to the expert in the sector, the new material can in any case be of a recycled type, or in any case can be not virgin material.

Generally the new paving material (N) is asphalt, i.e. a product comprising bitumen. Hot asphalt type asphalt is typically used, usually at a laying temperature of between 400 K and 440 K; there exist, however, numerous variants, for example Warm Mix Asphalt, and the sector is in continuous development. Notwithstanding this, the invention is not suitable for cold asphalt type asphalt, which has a usual laying temperature of between 280 K and 310 K.

Although the compactor (4) illustrated in the drawings is of the vibrating plate type, the invention can also use other compactor (4) technologies, for example with a vibrating roller. The compactor (4) can have an operating width, according to a second direction (B) transversal to the first direction (A), substantially equal to the zone to be patched (Z).

The vehicle (1) of the invention enables integration with modern management systems of the interventions that can occur with growing levels of automation. As is visible in the embodiment of FIG. 1, the vehicle (1) comprises all the elements necessary and operates autonomously, i.e. the driver drives the vehicle within the road network to satisfy the demands for interventions with no need for other vehicles or auxiliary tools except, possibly for the tasks required for vehicular traffic control. The driver preferably receives information from the vehicle (1) to identify the zones to be patched (Z) on the road pavement. For example the vehicle (1) might receive information, such as GPS coordinates, regarding the position of the patches to be realised and communicate the information to the driver. It is also possible for the vehicle (1) to be of the automatically guided type and, at least in proximity of the zone to be patched (Z), for the vehicle to position itself automatically.

The patching operations are preferably managed by a control unit (9) which controls the movement of the movable part (20) of the support structure (2). In other words, the control unit (9) is configured to move the movable part (20) above the zone to be patched (Z) so that each of the rake (5), the paver (3) and the compactor (4) operate in succession on a plurality of parts of the zone to be patched (Z) after the zone to be patched (Z) has been heated by a radiating plate (7) which has a radiating area that is greater than the operating area of each single tool. The control unit (9) usually also controls the activation of the various tools borne by the movable part (2), as well as the movement of the first movable beam (23) and the second movable beam (24) described herein. The control unit (9) can also interface with the management system of the road network or with detection systems of the position of the vehicle as illustrated by way of example in the foregoing.

The radiating plate (7) and the movable part (20) are preferably arranged in succession in the longitudinal direction (L). In this way the structure and management of the vehicle (1) tends to be simplified as well as enabling the heating with the radiating plate (7) of a second zone to be patched (Z') while the movable part (20) works on the zone to be patched (Z).

The first direction (A) is preferably parallel to the longitudinal direction (L) and the radiating plate (7) is located between the axle of the vehicle (1) closest to the movable part (20) and the movable part (20). It is therefore possible to operate in succession on portions of existing road pavement which are continuous to one another or substantially continuous.

This position also enables heating a portion of road pavement successive to the zone to be patched (Z) which is being worked on, while the compactor (4) or other tools are in operation. This is particularly useful, for example, when the road pavement is to be treated over a greater area than the radiating area of the radiating plate (7). The radiating plate (7) is typically dimensioned to treat a zone in the order of a few square metres, and in this way it is possible even to work a road portion of a few tens of linear metres.

The radiating plate (7) preferably projects posteriorly from the frame (10) so as to facilitate the heating of a zone to be patched (Z) immediately following the zone to be patched (Z) on which the tools are working; the movable part (20) can support the rear fender for the same reason.

Further, the radiating area of the radiating plate (7) is greater than the respective operating area of the compactor (4) and the paver (3) and the movable part (20) translates in the first direction (A) on the basis of the extension of the radiating area of the radiating plate (7) along the first direction (A). More preferably, the movable part (20) translates in the first direction (A) at least by a distance identical to the extension of the radiating plate (7) along the first direction (A), so as to ensure the operativity of the tools borne on opposite sides; for example, FIG. 2 shows the paver (3) and the compactor (4) on opposite sides with respect to two columns (21).

The operating area corresponds to the zone affected by the action of the tool without the tool being moved. The area of activity is the part of the zone to be patched (Z) in which the tool is operating or can operate. The respective operating areas of the tools are visible in FIG. 13 and in FIG. 14 in which, for each tool, a possible path followed according to the invention has been indicated.

In a preferred embodiment, the radiating plate (7) translates vertically with respect to the frame (10) so as to limit the overall size of the vehicle (1).

The radiating plate (7) is usually located between the posterior axle of the axles of the vehicle (1), according to the normal advancement direction of the vehicle (1), and the movable part (20). This is advantageous both in terms of load distribution on the frame (10) and in order not to engage the zone around the driver with operating parts, i.e. around the cabin visible in FIG. 1. In other words the front position is usually rejected, for both structural and road safety reasons and for the avoidance of modifications to the drive cabin.

In general the tools are movable vertically with respect to the frame (10) so as to pass from a non-operating position away from the zone to be patched (Z) to an operating position near to the zone to be patched (Z). In this way the rake (5) and the paver (3), often together with the compactor (4), can intervene at successive times on the zone to be patched (Z). As will be discussed in the description of the method, with a single advance and reverse of the movable part (20) all the operations can be preferably carried out, more precisely the raking and thus the finishing and compacting. Also, in one or both of these steps the radiating plate (7) can be activated on a second zone to be patched (Z'). This latter action enables patching portions that extend the length, alike to what happens in traditional asphalting.

More preferably, the paver (3) and the compactor (4) are vertically movable with respect to the movable part (20) from a non-operating position away from the zone to be patched (Z) to an operating position near to the zone to be patched (Z).

Figure 4:
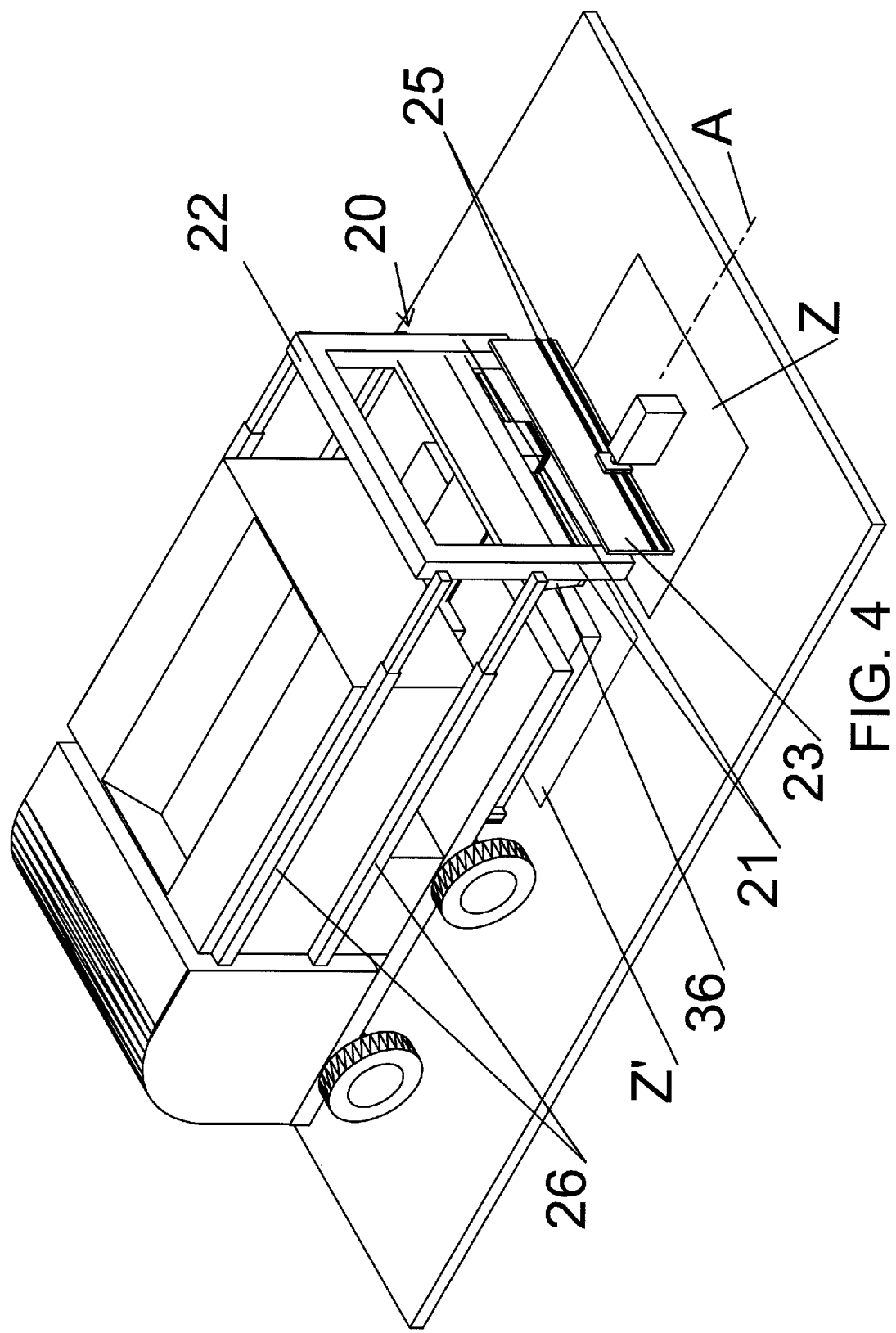

The movable part (20) of the support structure (2) is preferably of the portal type, or it comprises two columns (21) and a beam (22) which joins the columns, as for example visible in FIG. 4. The support structure (2) preferably comprises one or more arms which move the movable part (20) with respect to the frame (10) according to the first direction (A) while the tools move vertically with respect to the portal. The paver (3) and the compactor (4) are preferably vertically movable with respect to the columns (21) from a non-operating position away from the zone to be patched (Z) to an operating position near to the zone to be patched (Z). Further, the rake (5) is movable with respect to the columns (21) according to a second direction (B) transversal to the first direction (A) and is movable vertically with respect to the columns (21) so as to operate beneath the rest plane of the vehicle (1).

The portal structure movable in the first direction (A) and the tools movable vertically thereon simplify the structure and the management of the vehicle (1) as well as enabling the tools and the movable part (20) to be moved towards the frame (10).

In a preferred embodiment, visible for example in FIG. 4, the support structure (2) comprises telescopic guides (26) arranged horizontally which are directly or indirectly connected to the frame (10) and which support the movable part (20). In the embodiment illustrated in the drawings the telescopic guides (26) are connected to the container (6) which is fixed on the frame (10).

Figure 5:
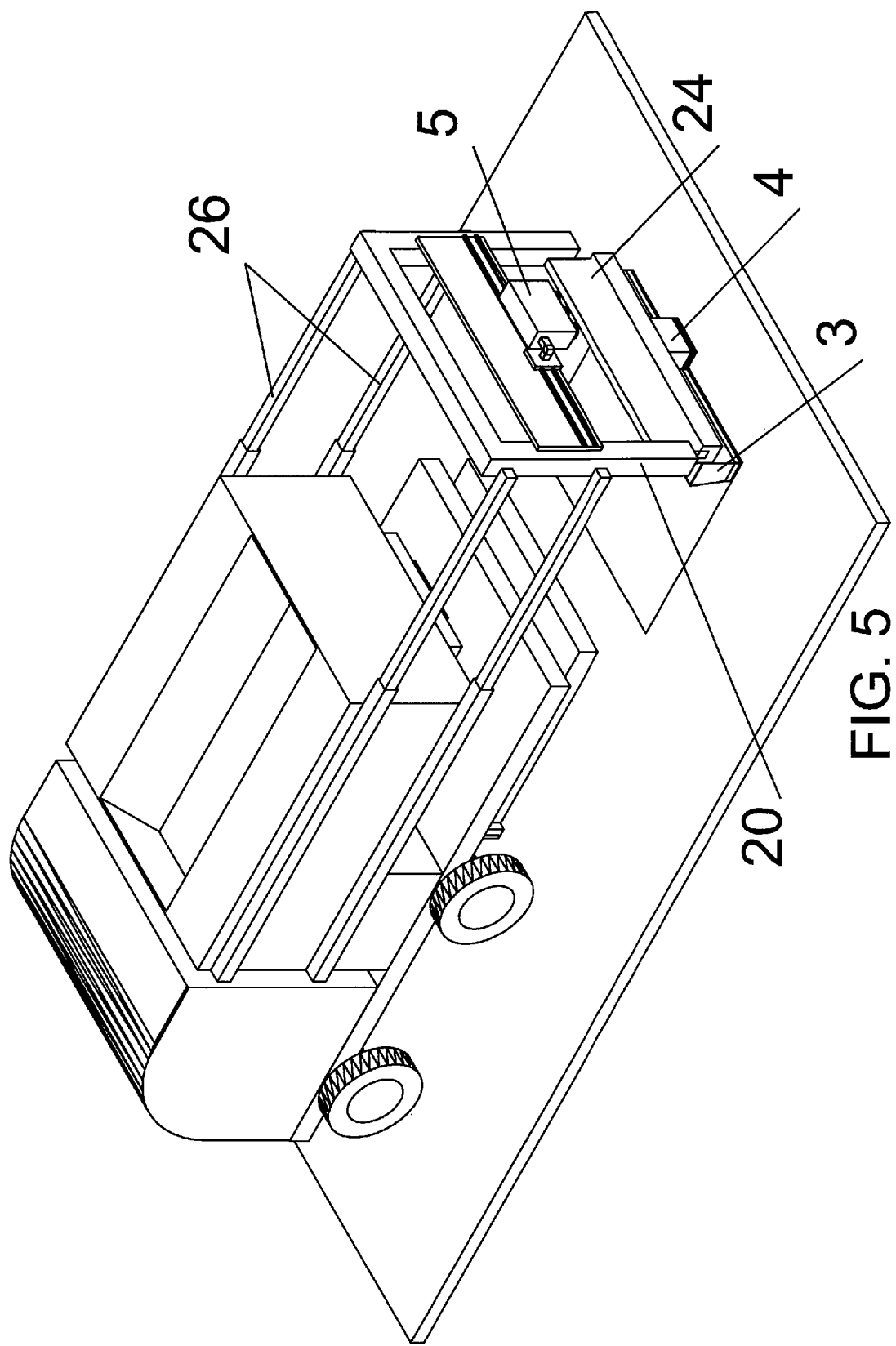
Figure 6:
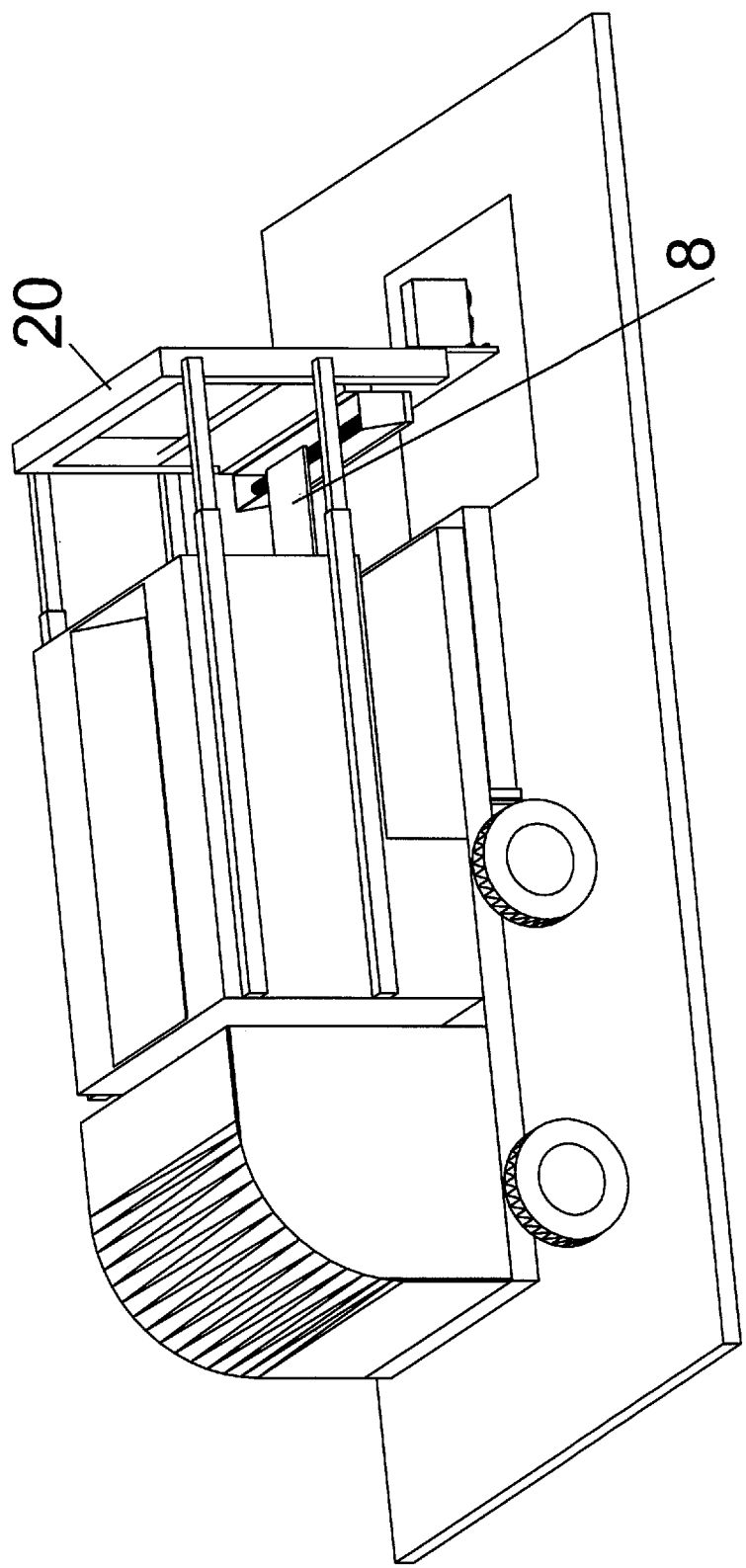
FIG. 6 illustrates the step of FIG. 4 from a different viewpoint.

FIG. 4 and FIG. 5 illustrate the telescopic guides (26) in the extended position in parallel directions to the longitudinal direction (L) of the vehicle (1). However the guides (26) could be arranged in parallel directions to the transversal direction (T) of the vehicle (1). Usually the version of the figures enables a smaller impact on the vehicular traffic, leaving the adjacent carriageway lanes free, and gives a better balance of the loads on the frame (10); further, it allows for working in one-way narrow streets.

As for example in the embodiment of FIG. 4, the vehicle (1) preferably comprises a first movable beam (23) which supports the rake (5) and is movable vertically with respect to the columns (21) with first movement means of known type (not illustrated). Likewise the vehicle (1) comprises a second movable rake (24) which supports the paver (3) and the compactor (4), and is also movable vertically with respect to the columns (21) with second movement means of known type (not illustrated).

With the vertical movement of the first movable beam (23) and the second movable beam (24) it is possible to vary the distance of the tools from the ground surface.

As is for example visible in FIG. 5, the second movable beam preferably bears the paver (3) and the compactor (4) on opposite sides thus facilitating a single movement of the movable part (20) to obtain a levelled and compacted patched zone.

As for example visible in FIG. 5 the rake (5) and the paver (3) are preferably borne by the movable part (20) on opposite sides, which facilitates the independent movement thereof; the rake (5) is more preferably borne on the side facing towards the frame (10) both to facilitate the automatic loading of the paver (3) by the container (6) and for a better distribution of the loads.

In an alternative that is not preferred the support structure (20) might be vertically mobile with respect to the frame (10) so as to bring at least one tool into the operating condition.

The paver (3) preferably extends transversally to cover the zone to be patched (Z) from one side to the other side thereof, so as not to request a movement in a second direction (B) transversal to the first direction (A), which might interfere with the levelling of the zone to be patched (Z).

The rake (5) might comprise fixed cogs. As shown in FIG. 17, the rake (5) preferably comprises prongs (51), or teeth, and a plurality of bodies that rotate with respect to respective vertical axes, each body being connected to and bearing in rotation the plurality of prongs (51).

The prongs (51) preferably extend in a radial direction and/or in a parallel direction, downwards, to the vertical axes of rotation of the bodies so as to move the material present in the zone to be patched (Z).

The rake (5) and the paver (3) are preferably configured to, respectively, rake and distribute and level the new paving material (N) over a width along a second direction (B), transversal to the first direction (A), smaller than the width of the radiating area along the second direction (B). The paver (3) has an operating width that is smaller than the radiating plate (7) and/or is operated in such a way as to distribute and level over a smaller width, for example by closing the openings (34) described in the following. The rake (5) usually has a smaller operating width and, as in the case of FIG. 13, is moved so as not to work on a part of the heated zone. Typically the radiating area of the radiating plate (7) is wider than a few centimetres, for example five centimetres per side. In this way a part of the existing road pavement is heated but not raked and new paving material (N) is not substantially laid thereon. The only-heated zone (H) binds best to the patched zone and avoids discontinuities and different behaviours between the two zones, as usually happens downstream of the operations of known type. In these operations, the patched zone is strictly separated from the surrounding zone so that it is likely that degrading effects can rapidly be generated, due to micro-cracking or cracking, for example due to different dilations of the two zones.

FIG. 13 illustrates an example of an only-heated zone (H) in which the radiating area is also greater in the first direction (A), though this characteristic is not strictly necessary in the case of a second zone to be patched (Z').

In a case where the rake (5) is movable with respect to the movable part (20) in the horizontal second direction (B), the control unit (9) if present also controls the movement of the rake (5) with respect to the support structure (2) and is configured to move the rake (5) according to a sequence which comprises transversal movements parallel to the first direction (A) so as to operate the rake (5) over the whole zone to be patched (Z), as can be seen in FIG. 13. The compactor (4) can be operated in an entirely like way, as can be seen in FIG. 14, unless the compactor (4) extends transversally to the first direction (A) over the whole transversal extension of the zone to be patched (Z).

In the case of an arrangement of the movable part (20) laterally to the frame (10), FIGS. 13 and 14 are rotated by a right angle.

Figure 18:
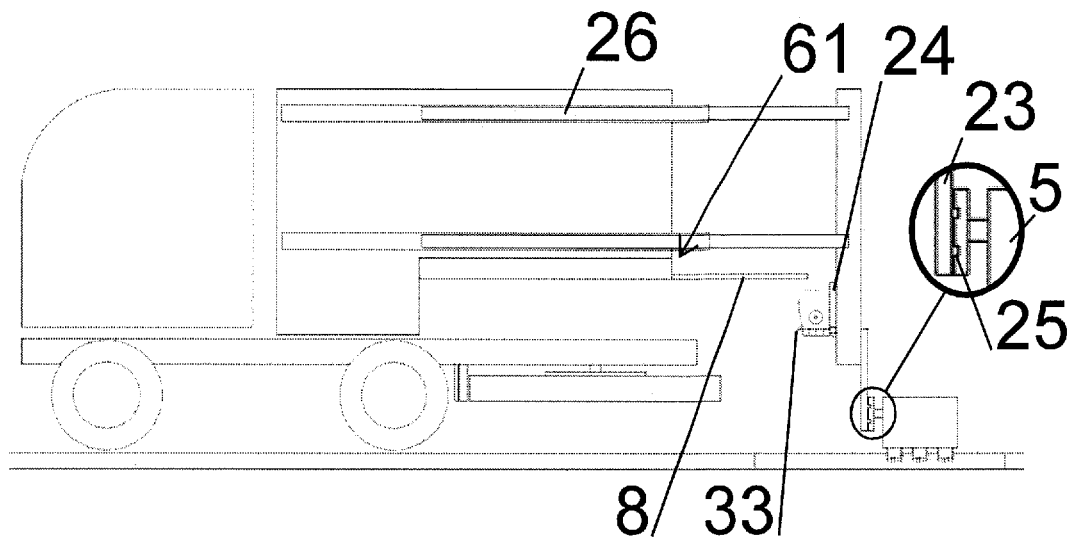

In a preferred embodiment the vehicle (1) comprises one or more linear guides (25), or binary guides, which are arranged transversally with respect to the first direction (A). Each of the tools can thus slide on one or more of these linear guides (25). FIG. 4 and FIG. 18 illustrate how the one or more linear guides (25) can be solidly constrained to the first movable beam (23) and/or the second movable beam (24).

Figure 7:
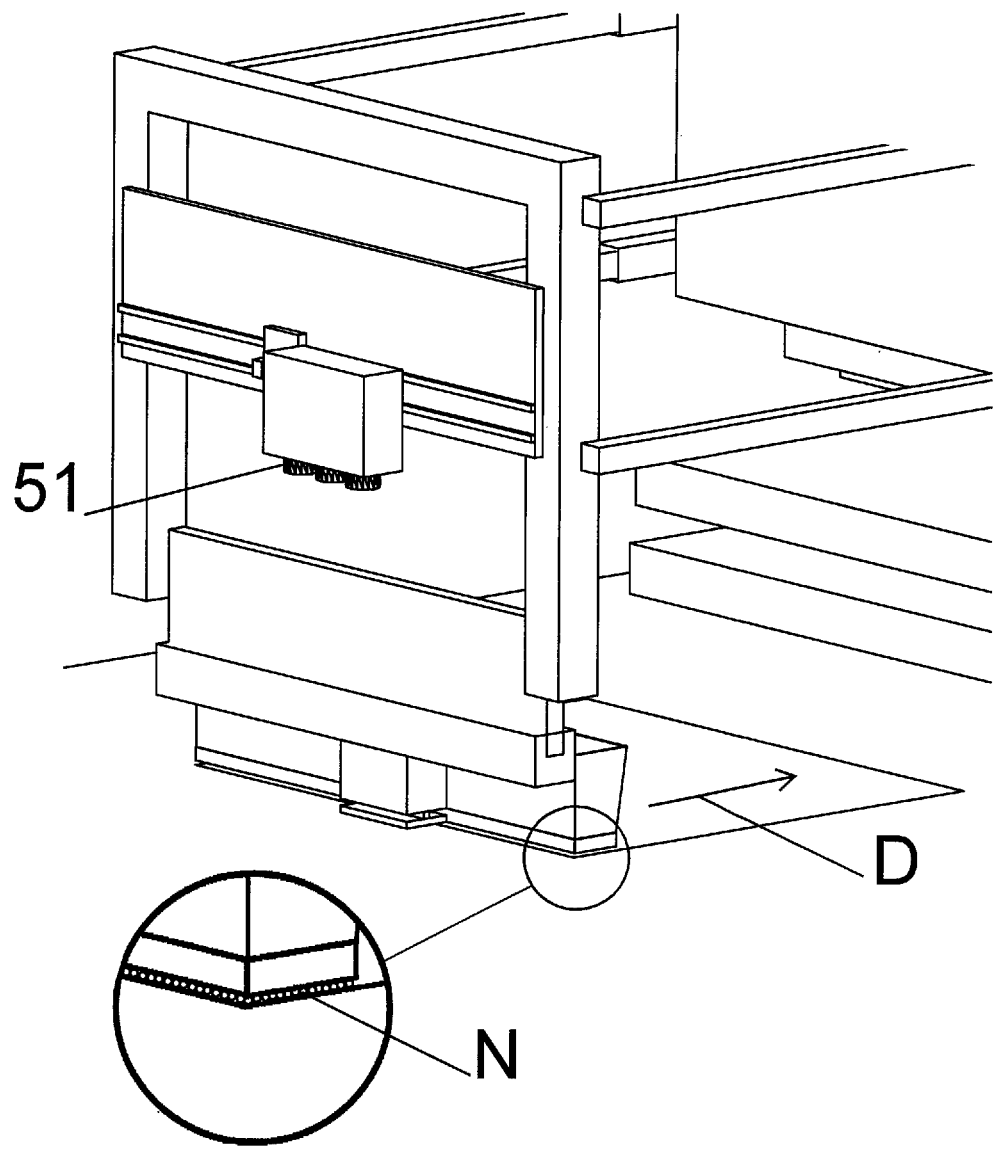
FIG. 7 is a detail in perspective view of the step of FIG. 5, with a further detail.
Figure 8:
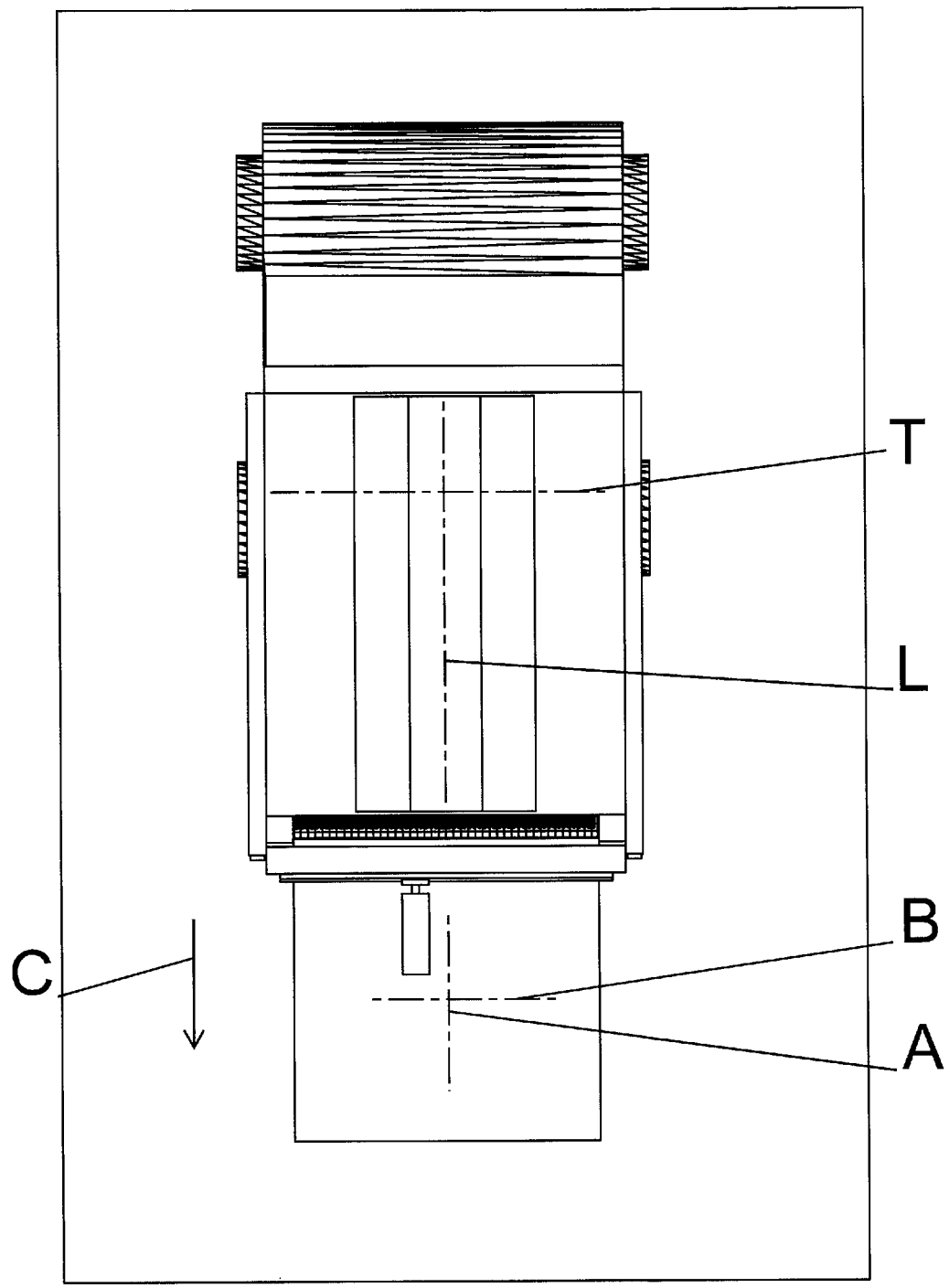
FIG. 8 is a view from above of a step of the method of FIG. 3.
Figure 9:
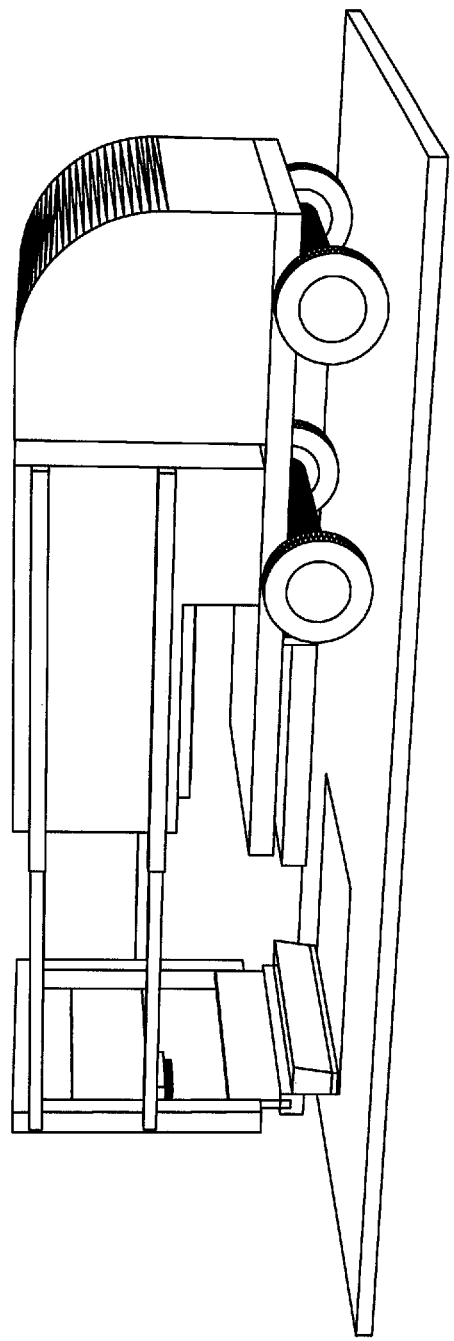
FIG. 9 illustrates the step of FIG. 5 from a different viewpoint.

The paver (3) preferably comprises a hopper (36) for distributing the new paving material (N) and means to level it; it is further configured to load the new paving material (N) in a raised position with respect to the rest plane of the vehicle (1) so as to substantially reform the road pavement following compacting. This for example can be observed in the detail of FIG. 7 which illustrates how the paver (3) unloads the new paving material (N) by force of gravity.

The paver (3) preferably comprises a hopper (36) for receiving the new paving material (N), a grid for distributing the new paving material (N) which inferiorly closes the hopper (36) and which comprises, or defines, openings (34) and a plurality of shut off means, each for obstructing or freeing one or more openings (34).

The vehicle (1) more preferably comprises a control unit (9) which is configured to control the plurality of shut off means so that they obstruct the openings (34) of a respective shut off means when they are located at an obstacle (O).

The grid preferably has a regular distribution of the openings (34) and, more preferably, the dimension of each opening (34) is in the order of a few centimetres, for example square or rectangular with sides of between 2 cm and 20 cm, preferably 4 cm. The lower and upper dimensional ends of the openings (34) respectively derive from the ability thereof to be passed-through by new paving material (N) and from the dimension of the area of the obstacle that can be covered without compromising the functionality thereof.

FIG. 12 illustrates a portion of road pavement with an obstacle, in the particular case a circular manhole, with the dimensions of the openings (34) reproduced in successive positions of the movable part (20). Note how some openings (34) are located between an area to be filled and an area not to be filled with new paving material (N). These openings (34) must necessarily remain open and the area of the obstacle which is covered changes on the basis of the dimension thereof.

The plurality of shut off means preferably comprises a plurality of blades (32) each of which is configured to close or open one or more respective openings (34) of the grid so as to enable or not the passage of material through the grid. The opening and closing preferably take place due to the roto-translations of the blades (32); this movement enables gradually resisting the weight of the asphalt. The position of the blades (32), vertical and internal of the grid, leads to a reduced size being possible. The movement preferably takes place along guides (35) solidly constrained on the grid, for example four lateral guides (35), two horizontal and two vertical, located in proximity of the lateral edges of the blade, as can be observed in the section view of FIG. 21.

In a case where the paver (3) comprises a plurality of shut off means, the vehicle (1) preferably also comprises at least a sensor for detecting a position of obstacles (O), i.e. zones not to be covered, for example manhole covers. For example, the at least a sensor can be a video camera supported by the frame (10) which detects the position of obstacles (0) with respect to the frame (10). More preferably the at least a sensor is connected to the control unit (9) which controls the closing or opening of each of the shut off means of the plurality of shut off means.

Numerous possible variant embodiment are possible for the unloading of the new paving material (N). In a simple preferred embodiment, the material is directly unloaded internally of the paver (3), in general in the hopper of this embodiment, from an outlet (61) beneath the container (6). In this case the hopper is preferably dimensioned so as to receive the new paving material (N) which is in general used for a zone to be patched (Z) having substantially the same dimensions as the radiating plate (7), so as not to have to move the support structure (2) to replenish the paver (3). In a preferred embodiment the vehicle (1) comprises a conveyor belt (8) which is movable from a retracted position to an extracted position in order to follow the paver (3) and supply it with new paving material (N). Other versions might comprise feed screws or other transport means.

Figure 10:
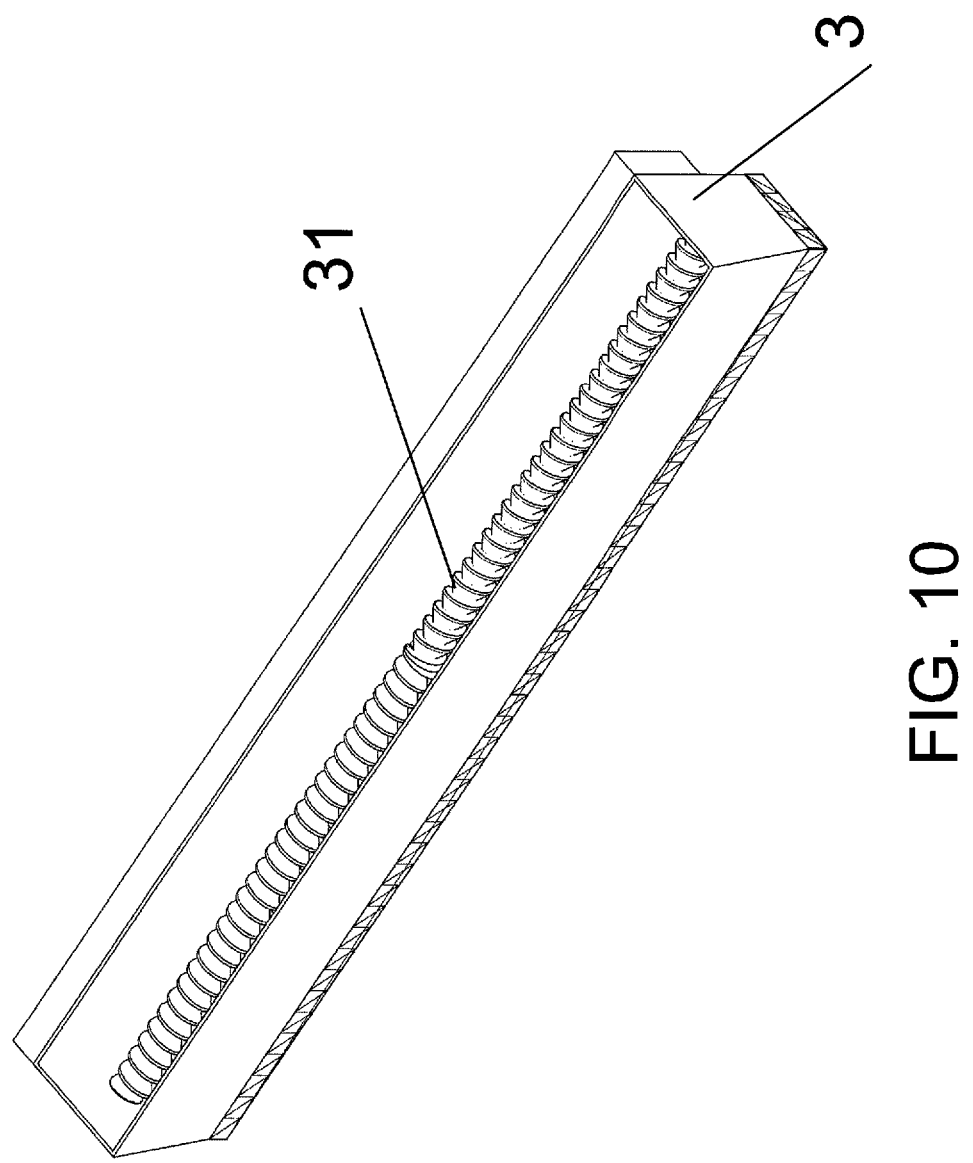
FIG. 10 is a perspective view of an embodiment of the paver.
Figure 11:
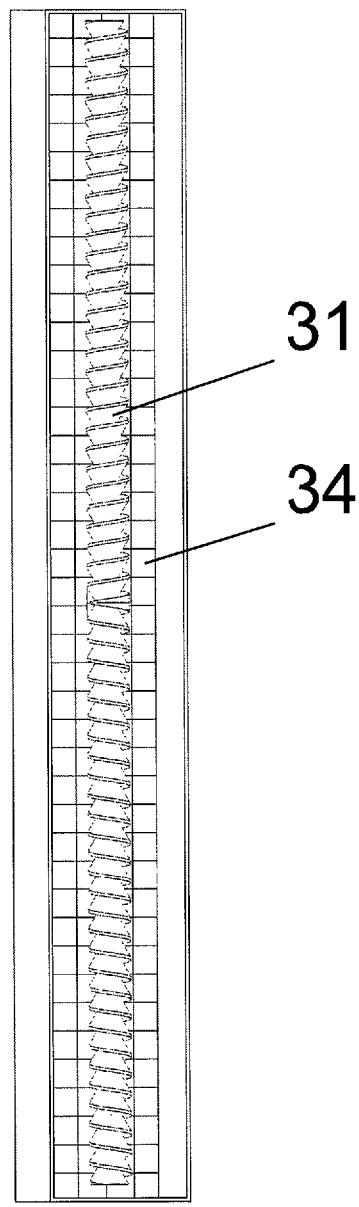
FIG. 11 is a view from above of the paver of FIG. 10.
Figure 16:
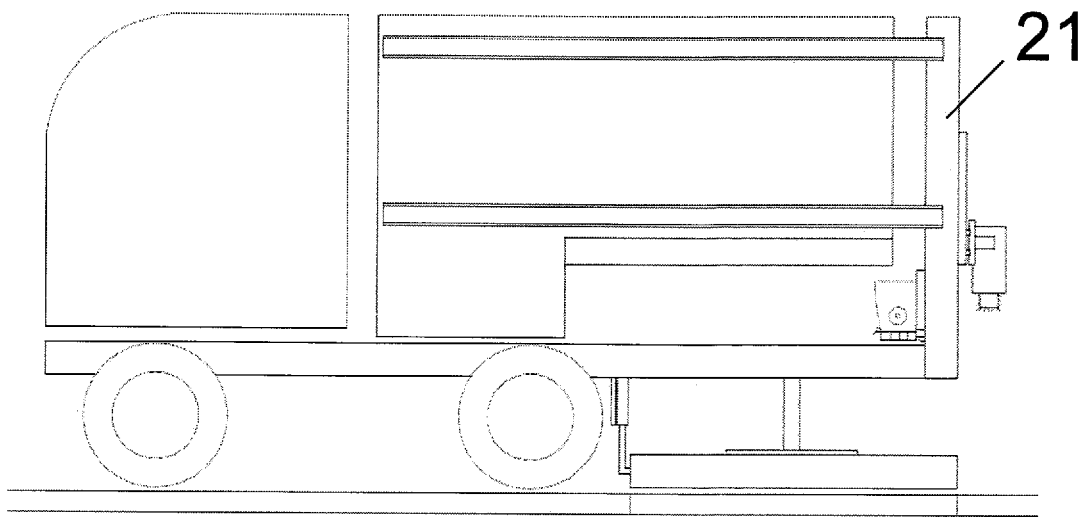

As visible in FIGS. 10 and 11 the paver (3) preferably comprises a rotating feed screw (31) or a rotating grub screw, and more preferably the feed screw (31) comprises a first part and a second part oriented opposite to one another to laterally distribute the new paving material (N).

Figure 21:
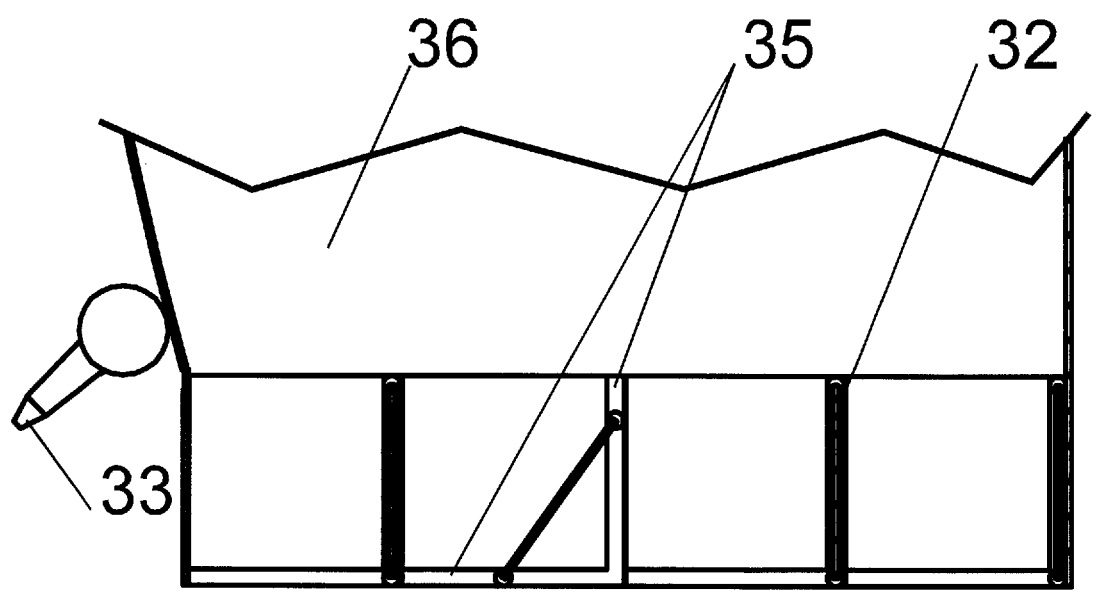
FIG. 21 is a partial lateral section view of the embodiment of the paver of FIG. 20, with a portion of the hopper also visible.

In general the vehicle (1) also comprises nozzles (33) for distributing a bitumen emulsion, the nozzles (33) are preferably borne by the paver (3) for example as in FIG. 18 or in FIG. 21.

The control unit (9) can comprise a communication interface and a GPS tracker to receive information on the patches to be carried out and to identify zones of pavement to operate on, by placing the radiating plate (7) and/or the movable part (20) respectively on or in proximity.

The invention also relates to a method for patching road pavements which comprise bituminous mixes; the description of the method that follows enables better delineation of the vehicle (1) illustrated in the foregoing.

In an embodiment the method comprises steps of:
providing a vehicle (1) for patching road pavements according to the invention;
providing a new paving material (N);
loading the container (6) with the new paving material (N);
activating the radiating plate (7) into the active position to heat a zone to be patched (Z) so that it becomes rakeable;
loading the paver (3) with the new paving material (N) from the container (6);
activating the rake (5) by translating the movable part (20) in the first direction (A) to level successive parts of the zone to be patched (Z);
activating the paver (3) by translating the movable part (20) in the first direction (A) in order to distribute and to level the new paving material (N) in successive parts of the zone to be patched (Z);
activating the compactor (4) by translating the movable part (20) in the first direction (A) to compact successive parts of the zone to be patched (Z).

The above-described vehicle (1) can be advantageously used to patch existing road pavements with the method illustrated in the foregoing in order to attain the aims of the invention, in particular a rapidly applied and durable patch.

The existing road pavement becomes rakeable when at least part of the bitumen has melted, in particular the bitumen present in a portion of a few centimetres of depth tends to melt; the rake (5) is then used to work internally of said portion.

According to the constructional characteristics of the vehicle (1), which can have (or not) a conveyor belt (8), the step of loading the paver take place before, during and/or after the step of activating the rake (5).

The method preferably comprises a step of heating the new paving material (N) after the step of providing a new paving material (N), i.e. a new paving material (N) is provided that is not of the cold type, and preferably of the hot type. The step of heating the new paving material (N) can take place in an asphalt production plant of asphalt and/or internally of the container (6). In other words cold asphalt type asphalt is not used.

As known to the expert in the sector, the radiating plate (7) can comprise a plurality of radiating zones each of which being activatable independently of the others; consequently the extension of the zone to be patched (Z) can be smaller than the radiating area of the radiating plate (7). In this case the operator or the control unit (9) will move the tools over a more limited area.

The method preferably comprises steps of:
moving the vehicle (1) after the step of activating the radiating plate (7), so as to displace the radiating plate (7) from the zone to be patched (Z);
reactivating the radiating plate (7) into the active position to heat a second zone to be patched (Z') so that it becomes rakeable.

Further, the step of reactivating the radiating plate (7) takes place together with one or more of the steps of activating the rake (5), activating the paver (3) and activating the compactor (5).

The heating of a second zone to be patched (Z') can be thus carried out while one or more tools is operating in the previous zone to be patched.

In the step of moving the vehicle (1), the vehicle (1) is preferably moved in the first direction (A) for a portion equal to the length of the radiating area in the first direction (A). Thus patches will be obtained that extend in length, i.e. on successive zones of the existing road pavement.

In the step of activating the rake (5) the movable part (20) is preferably translated in a first sense (C) and the step of activating the paver (3) and the step of activating the compactor (4) are realised during a single translation of the movable part (20) in a second sense (D), opposite the first sense (C).

The first sense (C) is preferably directed towards the extracted position.

It is particularly useful, especially from the operational point of view, to realise the patch with a single extraction and a return into position of the movable part (20).

In the step of providing a vehicle (1), the vehicle (1) preferably comprises at least a sensor for detecting a position of obstacles (O) and the paver (3) comprises a hopper (36) for receiving the new paving material (N), a grid for distributing the new paving material (N) which inferiorly closes the hopper (36) and which comprises openings (34) and a plurality of shut off means, each for obstructing or freeing one or more openings (34). Further, in the step of activating the paver (3) one or more openings (34) of the grid are closed by the respective shut off means when the openings (34) insist only above the position of the obstacles (O), during the course of moving the movable part (20). As already illustrated, the obstacles (O) represent zones that should not be covered, such as for example manhole covers or holes or road sensors.

In the step of activating the radiating plate (7), an area greater than the area of the zone to be patched (Z) is preferably heated, i.e. the zone subsequently worked by the rake (5) in order to attain the advantages set out in the foregoing and as shown by way of example in FIG. 13.

The method preferably also comprises steps of:
receiving the position of zones to be patched (Z, Z'), for example in GPS coordinates;
driving the vehicle (1) in proximity of a first zone to be patched (Z) and then driving the vehicle (1) in proximity of the second zone to be patched (Z') after the zone to be patched (Z) has been patched up to patching all the zones to be patched (Z).

FIGS. from 1 to 5 as well as FIGS. 15, 16, 17, 18 and 19 enable an observation of the patching sequences of the road pavement. With reference to FIG. 15 the vehicle (1), of the type comprising a radiating plate (7), is positioned near the zone to be patched (Z) of the road pavement and the radiating plate (7) is then moved by translating vertically up to the position of FIG. 16. In general, in heating the existing road pavement a temperature of above 423 K is reached, often of around 443 K. To verify the temperature of the road pavement, the vehicle (1) comprises at least a sensor that informs the operator or which is connected to the control unit (9) and which determines the return of the radiating plate (7) into the non-active position. The heating is necessary to make the existing asphalt workable.

After the vehicle (1) has advanced, the rake (5), with the vehicle (1) stationary, is moved vertically, preferably by means of a translation or roto-translation, towards the zone to be patched (Z) so as to be in a condition to work, as can be seen in FIG. 17. In a preferred embodiment of the vehicle (1), the rake (5) is rotationally connected to the movable part (20) or to the first movable beam (23) with respect to a vertical axis so as to be able to assume a more compact position when the vehicle (1) is in motion, thus reducing the overall size during movement.

Owing to the rotational movement of the prongs (51), preferably made of metal, the heated asphalt is mixed and prepared for the regeneration step with the bitumen emulsion. The rake (5) covers the whole heated area with a transversal movement along the linear guides (25) mounted on the first movable beam (23) and with a longitudinal movement due to the movement of the movable part (20) of the support structure (2).

As can be seen in FIG. 18, during the raking, the paver (3) is preferably reached or followed by a conveyor belt (8) that bears the new paving material (N), generally asphalt, from the container (6) and releases it internally of the paver (3). In this way the new material remains inside the paver (3) for a short time so as to reduce cooling prior to the laying; this configuration is advantageous especially in cold seasons or climates. In a different configuration the paver (3) is initially loaded, for example when in proximity or below the container (6), and is preferably moved with the quantity of new material required for the patch. A feed screw (31) or grub screw, preferably with a bidirectional rotation present internally of the paver (3) distributes the new paving material (N) uniformly along the whole extension of the paver (3). The new material might possibly be unloaded by the container to the paver and/or from there to the ground by force of gravity.

Figure 19:
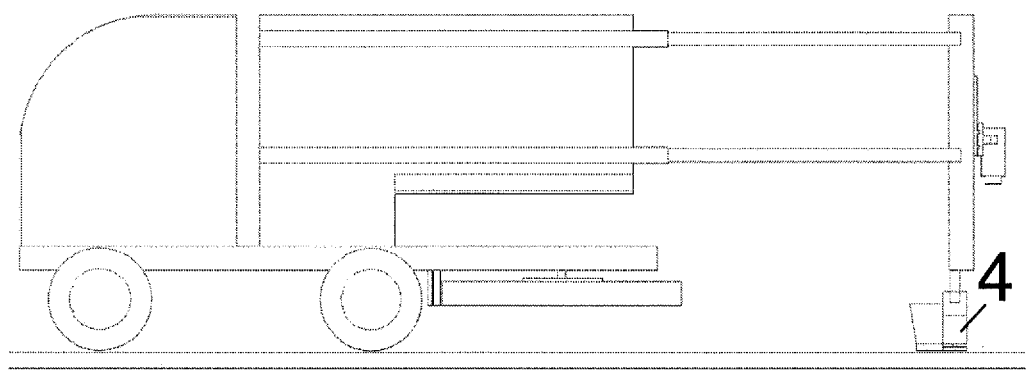
Figure 20:
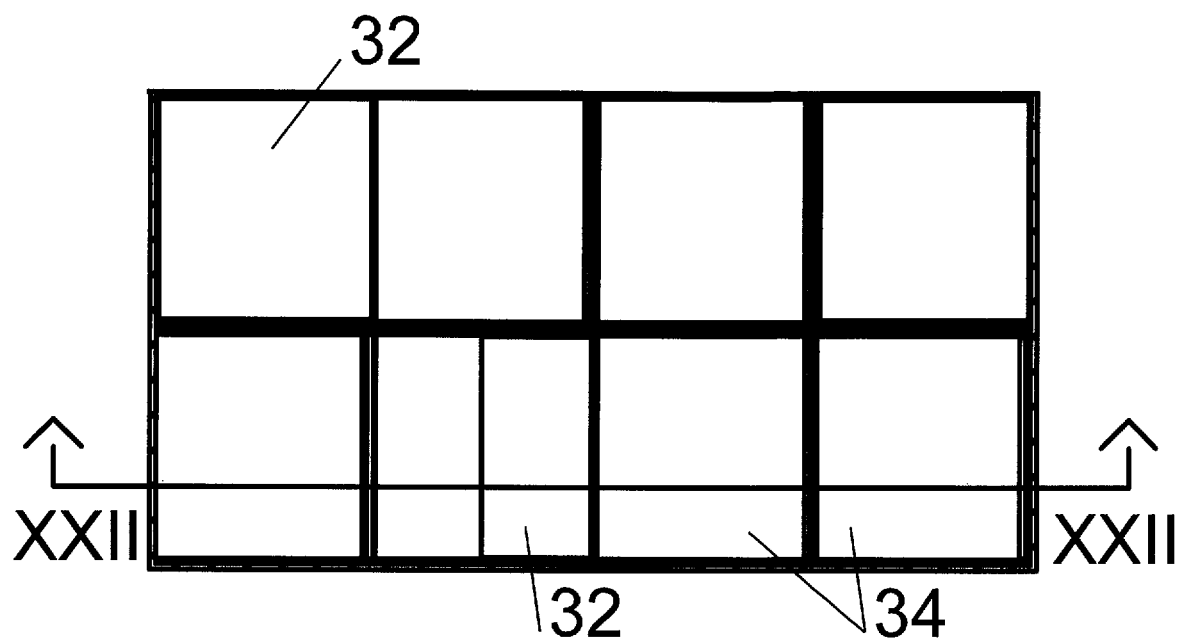
FIG. 20 includes a partial view from above of a further embodiment of the paver, with the hopper removed and along the cut section plane of the following figure.

Lastly, with reference to FIG. 19, after the rake (5) has completed operations in the zone to be patched (Z) and has been raised, the paver (3) and the compactor (4) descend, preferably translating vertically to reach the level of the road pavement.

As it advances in the longitudinal direction (L), and owing to the movement of the movable part (20) of the support structure (2), the paver (3) spreads the bitumen emulsion and at the same time releases, for example from openings (34) of the grid, the new paving material (N) at the height required for the operation. In this way, the distribution is uniform along the whole zone to be patched (Z) which is then compacted by the compactor (4) which follows the movement of the paver (3) and, preferably, a transversal movement in a second direction (B) along a respective linear guide. As is visible in the embodiment of FIG. 5, the paver (3) is located superiorly of the compactor (4).

In all the above cases, usually during the course of the whole patching operation, the control unit (9), after having identified the area, controls and activates the elements of the vehicle (1) as described in the foregoing.

From the description of the operating sequence, it is clear how the patch is done rapidly, in a strongly automated way, with a high level of safety and a limited impact on vehicular traffic. The patch obtained in this way is structurally alike to the existing road pavement and is bonded thereto. The patch takes place with the vehicle (1) stationary and the operator or operatives can dedicate themselves exclusively to the control of the vehicular traffic, especially if the movement of the vehicle (1) after the heating takes place automatically.

The radiating plate (7) is preferably an infra-red radiating plate.

As is clear to the expert in the sector, the reference in the present description to the zone to be patched (Z) of the road pavement is used to provide a better and more direct understanding of the characteristics of the invention. The frame (10) is characterised by a height from the ground and the support structure (2) and the tools are substantially dimensioned with respect to the height from the ground of the frame (10).

It is understood that the above has been described by way of non-limiting example and that any constructional variants are considered to fall within the protective scope of the present technical solution, as claimed in the following.

The invention claimed is:

1. A vehicle for patching road pavements which comprise bituminous mixes which has a longitudinal direction, comprising:
   a frame;
   a container for holding a new paving material;
   a radiating plate for heating a zone to be patched which has a radiating area;
   a rake for raking the zone to be patched;
   a paver for distributing and levelling the new paving material in the zone to be patched;
   a compactor for compacting the zone to be patched and the new paving material;
   a support structure which comprises a movable part; wherein:
   the frame supports the container and the support structure;
   the container comprises an outlet for feeding the paver with the new paving material;
   the movable part bears the paver, the rake and the compactor;
   the movable part translates with respect to the frame according to a first direction from a retracted position to an extracted position in which the volume of the vehicle is greater;
   the movable part is configured to translate so that the rake operates in succession on a plurality of parts of the zone to be patched, the paver operates in succession on a plurality of parts of the zone to be patched and the compactor operates in succession on a plurality of parts of the zone to be patched;
   the frame supports the radiating plate which is movable vertically beneath the frame from a non-active position near to the frame to an active position away from the frame;
   the rake is vertically movable with respect to the paver and the compactor.

2. The vehicle of claim 1 wherein the radiating plate and the movable part are arranged in succession in the longitudinal direction.

3. The vehicle of claim 1 wherein:
   the support structure comprises one or more arms which move the movable part with respect to the frame according to the first direction;
   the movable part comprises two columns and a beam;
   the paver and the compactor are vertically movable with respect to the columns from a non-operating position away from the zone to be patched to an operating position near to the zone to be patched;
   the rake is movable with respect to the columns according to a second direction transversal to the first direction;
   the rake is vertically movable with respect to the columns so as to operate beneath the rest plane of the vehicle.

4. The vehicle of claim 1 wherein the rake comprises prongs and a plurality of bodies that rotate with respect to respective vertical axes, each body being connected to a plurality of prongs which move in rotation the plurality of prongs.

5. The vehicle of claim 1, wherein the rake and the paver are configured respectively in order to rake and distribute and level the new paving material over a width along a second direction, transversal to the first direction, smaller than the width of the radiating area along the second direction.

6. The vehicle of claim 1, further comprising a control unit, wherein:
   the paver comprises a hopper for receiving the new paving material, a grid for distributing the new paving material which inferiorly closes the hopper and which comprises openings and a plurality of shut off means, each for obstructing or freeing one or more openings;
   the control unit is configured to control the plurality of shut off means so that they obstruct the openings of a respective shut off means when they are located at an obstacle.

7. The vehicle of claim 2 having one or more axles in which the first direction is parallel to the longitudinal direction and the radiating plate is located between the axle of the vehicle closest to the movable part and the movable part.

8. The vehicle of claim 7 wherein the radiating plate translates vertically with respect to the frame.

9. The vehicle of claim 7 having a normal advancement direction, wherein the axle of the vehicle closest to the movable part is the posterior axle according to the normal advancement direction.

10. A method for patching road pavements which comprise bituminous mixes comprising steps of:
   providing a vehicle for patching road pavements according to any one of claims from 1 to 6;
   providing a new paving material;
   loading the container with the new paving material;
   activating the radiating plate into the active position to heat a zone to be patched so that it becomes rakeable;

loading the paver with the new paving material from the container;
activating the rake by translating the movable part in the first direction to level successive parts of the zone to be patched;
activating the paver by translating the movable part in the first direction in order to distribute and to level the new paving material in successive parts of the zone to be patched;
activating the compactor by translating the movable part in the first direction to compact successive parts of the zone to be patched.

11. The method of claim 10, comprising a step of moving the vehicle after the step of activating the radiating plate, so as to displace the radiating plate from the zone to be patched, and a step of reactivating the radiating plate into the active position in order to heat a second zone to be patched so that it becomes rakeable, and wherein the step of reactivating the radiating plate takes place together with one or more of the steps of activating the rake, activating the paver and activating the compactor.

12. The method of claim 11, wherein during the step of moving the vehicle, the vehicle is moved into the first direction for a portion equal to the length of the radiating area in the first direction.

13. The method of claim 10, wherein in the step of activating the rake the movable part is translated in a first sense and wherein the step of activating the paver and the step of activating the compactor are realised during a single translation of the movable part in a second sense, opposite the first sense.

14. The method of claim 10, wherein in the step of providing a vehicle, the vehicle comprises at least a sensor for detecting a position of obstacles and the paver comprises a hopper for receiving the new paving material, a grid for distributing the new paving material which inferiorly closes the hopper and which comprises openings and a plurality of shut off means, each for obstructing or freeing one or more openings and wherein in the step of activating the paver one or more openings of the grid are closed by the respective shut off means when the openings are located only above the position of the obstacles, in the movement of the movable part.

15. The method of claim 10, wherein in the step of activating the radiating plate an area greater than the area of the zone to be patched is heated.

* * * * *